(12) United States Patent
Yoshida

(10) Patent No.: US 7,031,052 B2
(45) Date of Patent: Apr. 18, 2006

(54) OPTICAL FIBER AMPLIFIER

(75) Inventor: Fumisato Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 329 days.

(21) Appl. No.: 10/461,380

(22) Filed: Jun. 16, 2003

(65) Prior Publication Data
US 2003/0231381 A1 Dec. 18, 2003

(30) Foreign Application Priority Data
Jun. 18, 2002 (JP) ............................. 2002-177596

(51) Int. Cl.
*H04B 10/12* (2006.01)
(52) U.S. Cl. .................................. 359/341.32
(58) Field of Classification Search ............. 359/341.3, 359/341.32
See application file for complete search history.

(56) References Cited

U.S. PATENT DOCUMENTS

| | | | | |
|---|---|---|---|---|
| 4,701,928 A | * | 10/1987 | Fan et al. ...................... | 372/68 |
| 5,224,116 A | * | 6/1993 | Whitley et al. ................ | 372/71 |
| 5,430,572 A | * | 7/1995 | DiGiovanni et al. ... | 359/341.33 |
| 5,991,069 A | * | 11/1999 | Jander ......................... | 359/337 |
| 6,327,412 B1 | * | 12/2001 | Kakui et al. ................ | 385/126 |
| 6,426,833 B1 | * | 7/2002 | Bao ....................... | 359/341.32 |
| 6,704,137 B1 | * | 3/2004 | Hamada ................... | 359/341.3 |
| 2001/0033412 A1 | * | 10/2001 | Vavassori et al. ......... | 359/341.3 |
| 2002/0021489 A1 | * | 2/2002 | Willets et al. ......... | 359/341.32 |
| 2002/0024726 A1 | * | 2/2002 | Hamada ................... | 359/341.3 |
| 2004/0012843 A1 | * | 1/2004 | Aozasa et al. ........... | 359/337.1 |

FOREIGN PATENT DOCUMENTS

| | | | |
|---|---|---|---|
| CN | 2319832 Y | | 5/1999 |
| JP | 5-224254 | | 9/1993 |
| JP | 2001223419 A | * | 8/2001 |
| JP | 2002-76481 A | | 3/2002 |
| JP | 2002-076481 A | | 3/2002 |

* cited by examiner

*Primary Examiner*—Jack Keith
*Assistant Examiner*—Eric Bolda
(74) *Attorney, Agent, or Firm*—Foley & Lardner LLP

(57) ABSTRACT

An optical fiber amplifier whose characteristics are stable is provided. The optical fiber amplifier provides a short wavelength transmitting coupler that multiplexes pumping light inputted from its forward side and inputted signal light, an EDF that amplifies the signal light inputted from the short wavelength transmitting coupler, a narrow-band coupler that multiplexes the signal light and the pumping light in the transmission band of the narrow-band coupler, a splitting coupler that splits the inputted pumping light at a designated ratio, and a pumping light LD that outputs the pumping light for amplifying the signal light. With this structure, at the optical fiber amplifier that amplifies many wavelengths together being adopted at the WDM transmission, even when the number of input signals is changed, the deterioration of noise figure is avoided.

12 Claims, 5 Drawing Sheets

F I G. 3
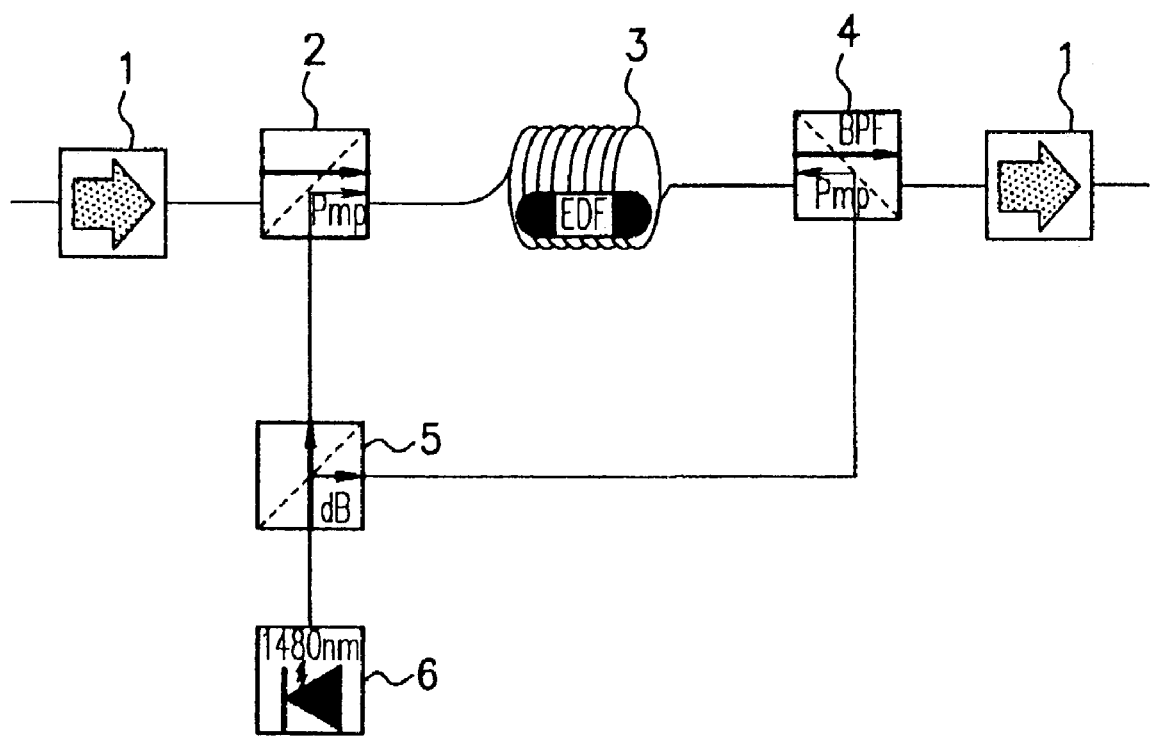

F I G. 5
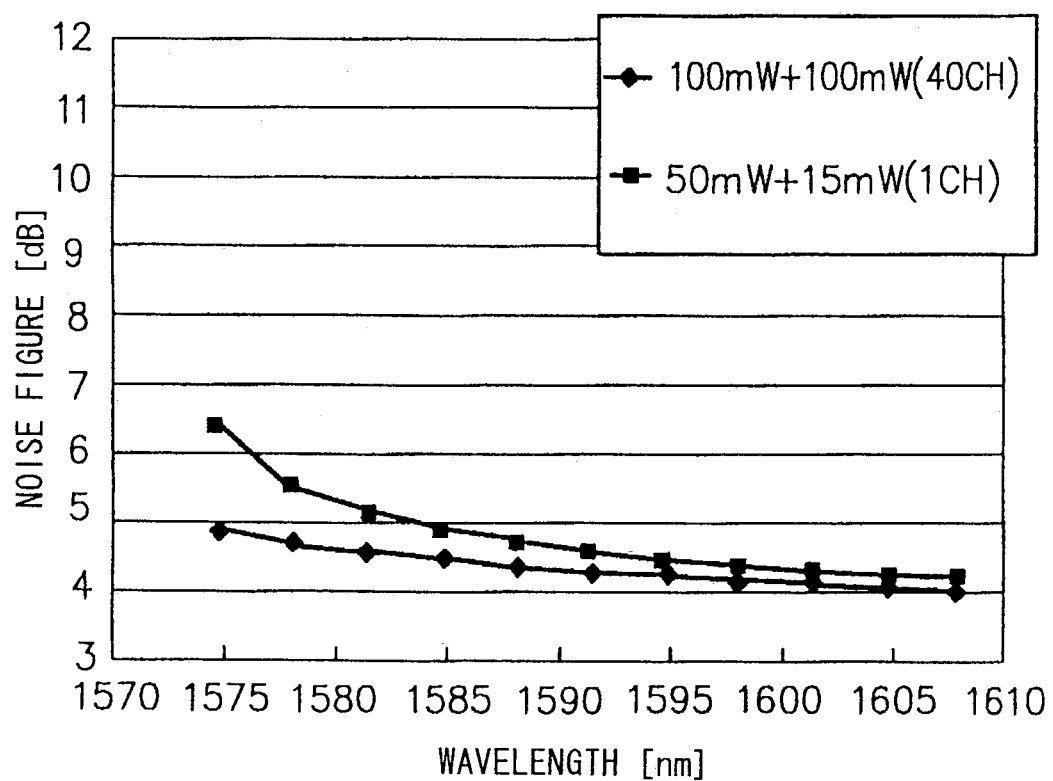

OPTICAL FIBER AMPLIFIER

BACKGROUND OF THE INVENTION

The present invention relates to an optical fiber amplifier, for example, which is used in a network such as the Internet.

DESCRIPTION OF THE RELATED ART

Recently, the Internet has been largely used and optical fiber amplifiers have been adopted in the Internet for meeting the increasing communication demand. Further, a WDM (wavelength division multiplexing) technology has been developed and the technology has been used widely.

With WDM technology, signal light of plural wavelengths is multiplexed in a wavelength region. When multiplexed signal light is used, the transmission capacity at an optical fiber transmission line can be increased. Therefore, with WDM technology, the transmission capacity can be easily increased by increasing the number of light signals (wavelength) to be multiplexed so that the wavelength band is widened. In an optical fiber amplifier adopting the WDM technology, low noise over a large input dynamic range is required.

FIG. 1 is a diagram showing a structure of a conventional optical fiber amplifier. First, the structure of the conventional optical fiber amplifier is explained. As shown in FIG. 1, the conventional optical fiber amplifier provides two short wavelength transmitting couplers 2, an EDF (erbium-doped fiber) 3, a splitting coupler 5, and an LD (laser diode) 6. In FIG. 1, the reference number 1 signifies the moving direction of input and output light.

LD 6 outputs pumping light of 1480 nm band. The splitting ratio at the splitting coupler 5 is 3 dB. The pumping light transmission band at the short wavelength transmitting coupler 2 is 1485 nm or less.

Next, the operation of the conventional optical fiber amplifier is explained. First, a case that the number of input signals is 40 channels is explained. In this case, the input signal power is −16 dBm/channel, the gain is 20 dB, and the output signal power is +4 dBm/channel, therefore, the total output power is +20 dBm. At this time, the output from the LD 6 of the 1480 nm pumping light band is 220 mW, and the pumping light of 100 mW is inputted to the EDF 3 from the forward side and also the pumping light of 100 mW is inputted to the EDF 3 from the backward side. Therefore, the operation at the time of high output power can be confirmed.

Next, a case that the number of input signals is 1 channel is explained. In this case, the input signal power is −16 dBm/channel, the gain is 20 dB, and the output signal power is +4 dBm/channel, therefore, the total output power is lowered to be +4 dBm. At this time, the output from the LD 6 of the 1480 nm pumping light band is lowered to be 66 mW, and the pumping light of 30 mW is inputted to the EDF 3 from the forward side and also the pumping light of 30 mW is inputted to the EDF 3 from the backward side. Therefore, the operation at the time of low output power can be confirmed.

As the first conventional technology, Japanese Patent Application Laid-Open No. 2002-76481 discloses an optical direct amplifier and a control method thereof. In this patent application, pumping light outputted from a laser light source is split into long wavelength light and short wavelength light at a wavelength. And one of the long wavelength light and the short wavelength light is inputted to an EDF as forward pumping light and the other light is inputted to the EDF as backward pumping light. And the ratio of the intensity between the forward pumping light and the backward pumping light is changed by controlling the temperature of the laser light source.

As the second conventional technology, Japanese Patent Application Laid-Open No. HEI 5-224254 discloses an optical fiber amplifier. In this patent application, the optical fiber amplifier provides a variable light splitter that splits pumping light outputted from a pumping laser at an arbitrary ratio. With this structure, an optical fiber amplifier having low noise or an optical fiber amplifier having high output power can be obtained corresponding to its purpose by changing the splitting ratio at the variable light splitter.

However, at the conventional technologies, there are the following problems. FIG. 2 is a graph showing the characteristics of noise figures at a long wavelength band in the conventional optical fiber amplifier. As shown in FIG. 2, at the conventional optical fiber amplifier, when the number of input signals is decreased, the deterioration of the noise figure of the optical fiber amplifier occurs.

At the first conventional technology, as mentioned above, the ratio of the intensity between the forward pumping light and the backward pumping light is changed by controlling the temperature of the laser light source. Further, the pumping light must be split at a wavelength.

At the second conventional technology, as mentioned above, the important point is to use the variable light splitter, when the pumping light is split at an arbitrary ratio.

Generally, at the optical amplifying operation, for example, the noise figure is deteriorated at the time when the number of input signals is small, depending on the input and output signal conditions. In order to solve this problem, the ratio of the pumping light power inputting to the EDF between from the forward side and the backward side is changed by applying temperature control to the oscillating spectrum of the pumping laser. Or the ratio of the pumping light power inputting to the EDF between from the forward side and the backward side is changed by using the variable light splitter.

SUMMARY OF THE INVENTION

It is therefore an object of the present invention to provide an optical fiber amplifier whose characteristics are stable. In more detail, at an optical fiber amplifier that amplifies many wavelengths together being adopted at the WDM transmission, a stable optical fiber amplifier, in which the deterioration of the noise figure is prevented even at the time when the number of input signals is changed, is provided.

According to a first aspect of the present invention, for achieving the object mentioned above, there is provided an optical fiber amplifier. The optical fiber amplifier provides a short wavelength transmitting coupler that multiplexes pumping light inputted from its forward side and inputted signal light, an EDF that amplifies the signal light inputted from the short wavelength transmitting coupler, a narrow-band coupler that multiplexes the signal light and the pumping light in the transmission band of the narrow-band coupler, a splitting coupler that splits the inputted pumping light at a designated ratio, and a pumping light LD that outputs the pumping light for amplifying the signal light.

According to a second aspect of the present invention, in the first aspect, the pumping light LD outputs pumping light of 1480 nm band or 980 nm band.

According to a third aspect of the present invention, in the first aspect, the center wavelength of the pumping light outputting from the pumping light LD is changed by a current value supplying to the pumping light LD.

According to a fourth aspect of the present invention, in the second aspect, the center wavelength of the pumping light outputting from the pumping light LD is changed by a current value supplying to the pumping light LD.

According to a fifth aspect of the present invention, in the first aspect, the center wavelength of the pumping light outputting from the pumping light LD is changed by a temperature applying to the pumping light LD.

According to a sixth aspect of the present invention, in the second aspect, the center wavelength of the pumping light outputting from the pumping light LD is changed by a temperature applying to the pumping light LD.

According to a seventh aspect of the present invention, in the first aspect, the EDF is an optical fiber in which erbium being a amplifying substance was doped.

According to an eighth aspect of the present invention, in the seventh aspect, at the time of high output power and low output power from the optical fiber amplifier, the power ratio of the pumping light inputting to the EDF between from the forward side and the backward side of the EDF is changed, and the deterioration of noise figure at the time of low output power caused by lowering the pumping light power is avoided without deteriorating the output power at the time of high output power.

According to a ninth aspect of the present invention, in the eighth aspect, the short wavelength transmitting coupler is positioned at the forward side of the EDF and the narrow-band coupler is positioned at the backward side of the EDF, and its pumping light wavelength is changed, and the power ratio of the pumping light is changed.

BRIEF DESCRIPTION OF THE DRAWINGS

The objects and features of the present invention will become more apparent from the consideration of the following detailed description taken in conjunction with the accompanying drawings in which:

FIG. 3 is a diagram showing a structure of an optical fiber amplifier at a first embodiment of the present invention;

FIG. 5 is a graph showing the characteristics of noise figures at a long wavelength band in the optical fiber amplifier at the first embodiment of the present invention.

DESCRIPTION OF THE PREFERRED EMBODIMENTS

Figure 1:
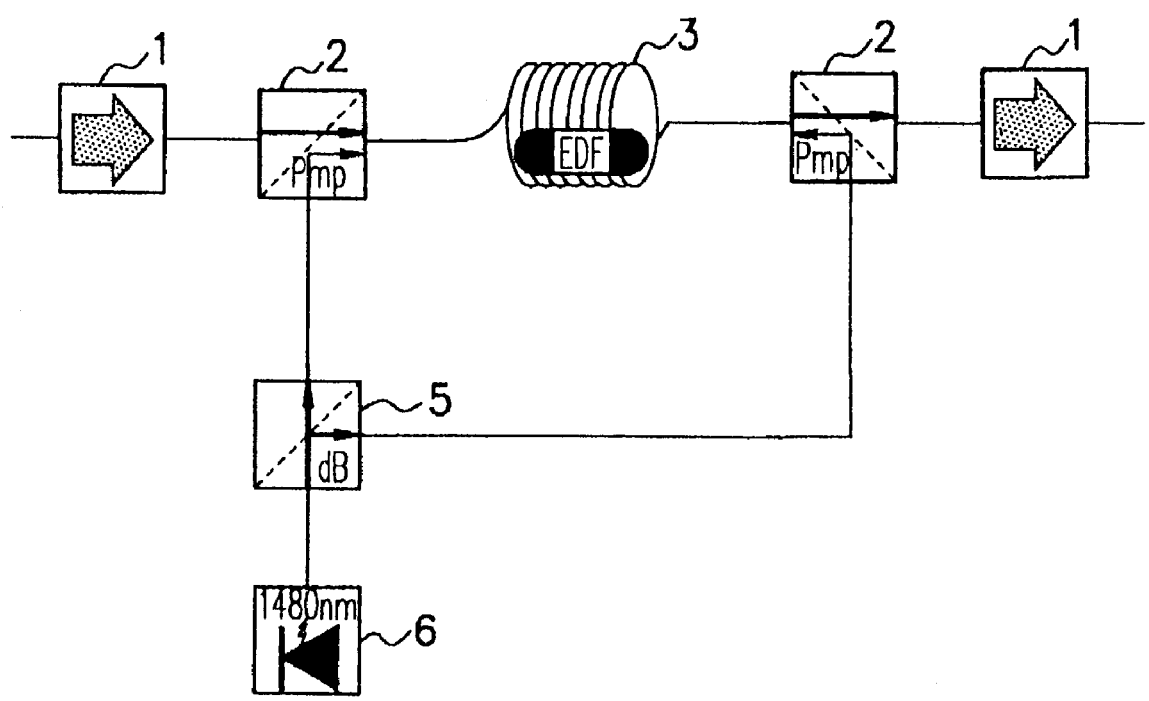
FIG. 1 is a diagram showing a structure of a conventional optical fiber amplifier.
Figure 2:
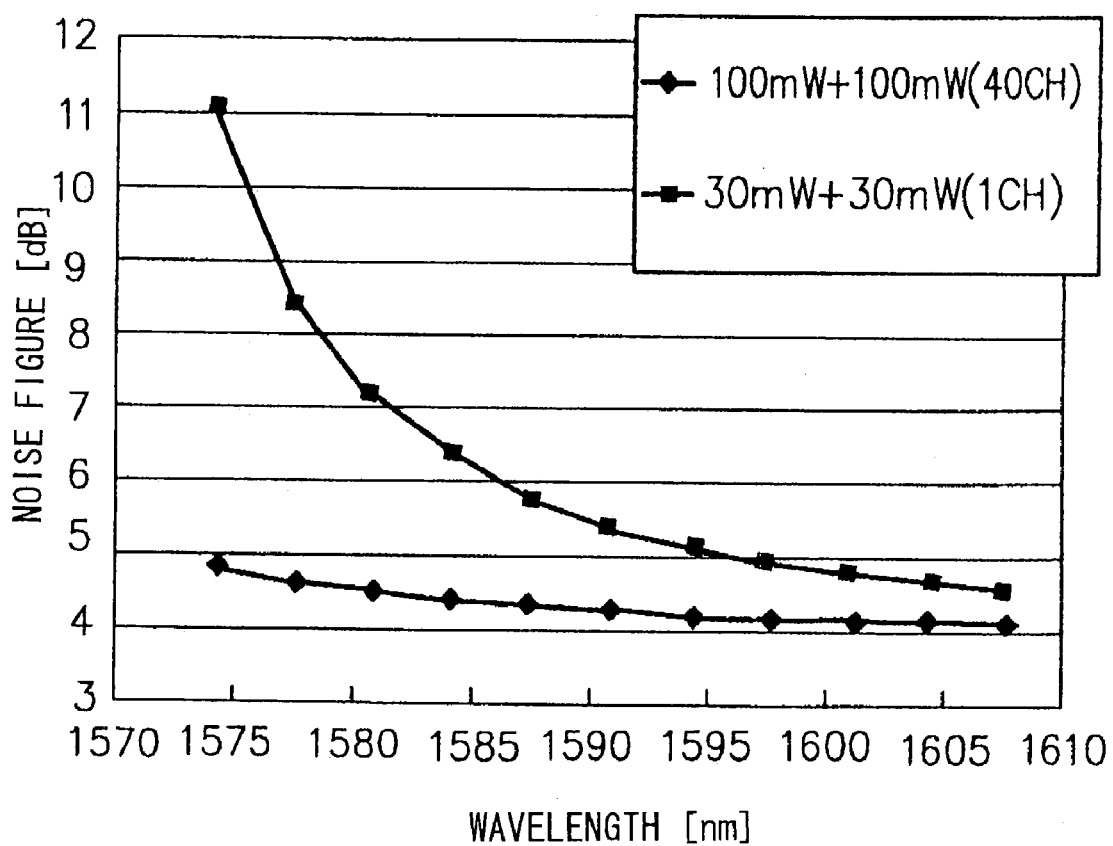
FIG. 2 is a graph showing the characteristics of noise figures at a long wavelength band in the conventional optical fiber amplifier.

Referring now to the drawings, embodiments of the present invention are explained in detail.

At an optical fiber amplifier in embodiments of the present invention, the deterioration of the noise figure at the time of low power output caused by lowering the power of Dumping light can be avoided. The deterioration can be avoided in that situation, without deteriorating the output when the power output is subsequently raised. When output power is low, the ratio between forward pumping light and backward pumping light inputted to an EDF is changed by changing a pumping light wavelength via current control or temperature control.

FIG. 3 is a diagram showing a structure of an optical fiber amplifier at a first embodiment of the present invention. First, the structure of the optical fiber amplifier at the first embodiment of the present invention is explained. At the first embodiment of the present invention, each of the components in the structure has the same reference number that at the conventional optical fiber amplifier shown in FIG. 1, in case that the function of the component is almost equal to that at the conventional optical amplifier.

As shown in FIG. 3, the optical fiber amplifier at the first embodiment of the present invention provides a short wavelength transmitting couplers 2, an EDF 3, a narrow-band coupler 4, a splitting coupler 5, and an LD 6. In FIG. 3, the reference number 1 signifies the moving direction of input and output light. The LD 6 outputs pumping light of 1480 nm band.

At the optical fiber amplifier in the first embodiment of the present invention, as shown in FIG. 3, the ratio of the pumping light power is changed by changing the pumping light wavelength by the uses of the short wavelength transmitting coupler 2 at the inputting forward side of the EDF 3 and the narrow-band coupler 4 at the inputting backward side of the EDF 3.

The EDF 3 is an optical fiber which erbium being an amplifying substance was doped in and amplifies signal light. One example of an EDF and an EDFA (erbium-doped fiber amplifier) is explained.

An EDFA, which uses pumping light by a semiconductor laser, directly amplifies light signals as that the light signals are light. And a special optical fiber, in which an extremely small quantity of an element called erbium (the symbol of the element is Er) was doped in a core part of an optical fiber, is used. And amplified signal light can be several hundred times more to several ten thousand times more than the original signal light, by the stimulated emission phenomenon induced by the energy supplied to this optical fiber from the semiconductor laser (pumping light source).

The LD 6 outputs pumping light of 1480 nm band for amplifying the signal light, and its center wavelength is changed by the supplying current value. The splitting coupler 5 splits the inputted pumping light at a ratio. The short wavelength transmitting coupler 2 multiplexes the inputted signal light and the pumping light from the splitting coupler 5, and inputs the multiplexed light to the EDF 3. The narrow-band coupler 4 multiplexes the signal light and the pumping light within its transmission band. The EDF 3 amplifies the signal light.

Next, referring to the drawings, the operation of the optical fiber amplifier at the first embodiment of the present invention is explained. The splitting ratio of the splitting coupler 5 is 3 dB. The pumping light transmission band at the short wavelength transmitting coupler 2 is 1485 nm or less. The pumping light transmission band at the narrow-band coupler 4 is 1473.5 to 1485 nm.

First, a case that the number of input signals is 40 channels is explained. In this case, the input signal power is −16 dBm/channel, the gain is 20 dB, and the output signal power is +4 dBm/channel, therefore, the total output power is +20 dBm. At this time, the output from the LD 6 of the 1480 nm pumping light band was 220 mW, and the driving current was 700 mA and the center wavelength was 1480 nm.

Figure 4:
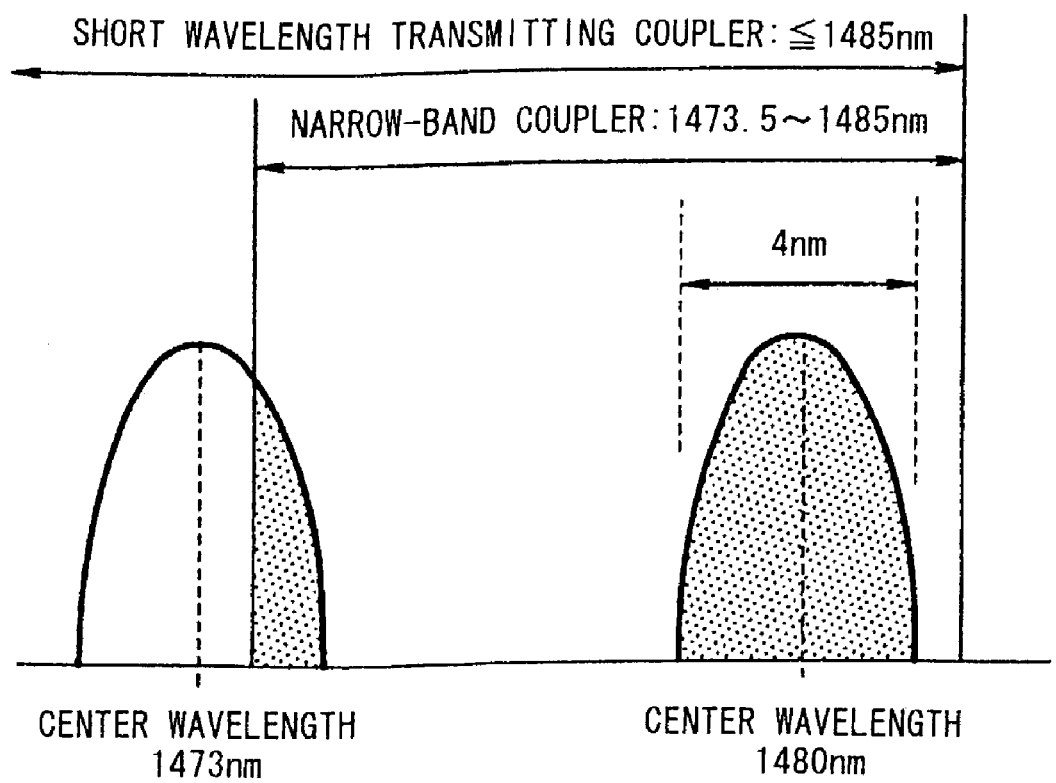
FIG. 4 is a diagram showing the characteristics of a short wavelength transmitting coupler and a narrow-band coupler in the optical fiber amplifier at the first embodiment of the present invention.

FIG. 4 is a diagram showing the characteristics of the short wavelength transmitting coupler 2 and the narrow-band coupler 4 in the optical fiber amplifier at the first embodiment of the present invention. As shown in FIG. 4, since the center wavelength of the LD 6 is 1480 nm, the loss of the pumping light does not occur at the pumping light transmission bands of the short wavelength transmitting coupler 2 and the narrow-band coupler 4. Therefore, the pumping light of 100 mW is inputted to the EDF 3 from the forward side and also the pumping light of 100 mW is inputted to the EDF 3 from the backward side. Therefore, the operation at the time of high output power can be confirmed.

Next, a case that the number of input signals is 1 channel is explained. In this case, the input signal power is −16 dBm/channel, the gain is 20 dB, and the output signal power is +4 dBm/channel, therefore, the total output power is lowered to be +4 dBm. At this time, the output from the LD 6 of the 1480 nm pumping light band is lowered to be 110 mW, and the driving current is lowered to be 350 mA. The center wavelength of the LD 6 shifts 2 nm every change of the driving current of 100 mA. Consequently, the center wavelength of the LD 6 at the time of 1 channel becomes 1473 nm. As shown in FIG. 4, the loss of the pumping light does not occur at the short wavelength transmitting coupler 2, but the loss of the pumping light occurs at the narrow-band coupler 4 from its pumping light transmission band. With this, the pumping light of 50 mW is inputted to the EDF 3 from the forward side and also the pumping light of 15 mW is inputted to the EDF 3 from the backward side. Therefore, the operation at the time of low output power can be confirmed.

FIG. 5 is a graph showing the characteristics of noise figures at a long wavelength band in the optical fiber amplifier at the first embodiment of the present invention. As shown in FIG. 5, at the first embodiment of the present invention, even as the number of input signals is changed, the deterioration of the noise figure is avoided by changing the ratio of the pumping light power between the forward pumping and the backward pumping.

At the first embodiment of the present invention, as the pumping light wavelength band, 1480 nm band is used, however, as the pumping light wavelength band, 980 nm band can be used.

The effect of the first embodiment of the present invention is that the noise figure of the optical fiber amplifier is not deteriorated even when the output power is changed. The reason is that the deterioration of the noise figure is avoided by changing the ratio of the pumping light power between the forward pumping and the backward pumping.

Next, a second embodiment of the present invention is explained. The structure of the optical fiber amplifier at the second embodiment of the present invention is the same as that at the first embodiment of the present invention. At the first embodiment of the present invention, the center wavelength of the LD 6 is changed by the current control. However, at the second embodiment of the present invention, the center wavelength of the LD 6 is adjusted by changing the temperature of the LD 6 of the 1480 nm pumping light band. That is, when the number of input signals is decreased, it is necessary to decrease the temperature of the LD 6. At the second embodiment of the present invention, as the pumping light wavelength band, 1480 nm band is used, however, as the pumping light wavelength band, 980 nm band can be used.

As mentioned above, at the first conventional technology, the ratio of the intensity between the forward pumping light and the backward pumping light is changed by controlling the temperature of the laser light source. Further, the pumping light must be split at a wavelength. And at the second conventional technology, the important point is to use the variable light splitter, when the pumping light is split at an arbitrary ratio.

However, at the first embodiment of the present invention, the ratio of the pumping light power inputting to the EDF 3 between from the forward side and from the backward side is changed, by not changing the temperature of the LD 6. Further, at the first embodiment of the present invention, a variable light splitter, which splits pumping light at an arbitrary ratio, is not used. And at the second embodiment of the present invention, the temperature control was applied, however, as mentioned above, the center wavelength of the LD 6 is changed by the temperature control, and the control method at the other parts is the same at the first embodiment.

Generally, the band of the WDM coupler, which is used at the time when pumping light and signal light are multiplexed, is obtained from the current to output power characteristic of the using pumping laser. And when the output power from the optical fiber amplifier is required to be large, the pumping light power inputting to the EDF is made to be large, and when the output power from the optical fiber amplifier is required to be small, the pumping light power inputting to the EDF is made to be small. Further, the forward pumping scheme, in which the pumping light power is inputted to the EDF from the forward side, is mainly applied, and the deterioration of the noise figure is prevented.

However, at the first and second embodiment of the present invention, the deterioration of the characteristic of the noise figure can be prevented by deciding the wavelength band of the WDM coupler (narrow-band coupler), which is positioned at the backward side of the EDF, without any other control, even when a usual pumping method is used.

As mentioned above, according to the first and second embodiments of the present invention, a pumping light LD outputs pumping light for amplifying signal light, and a splitting coupler splits the pumping light inputted from the pumping light LD by a splitting ratio. And a short wavelength transmitting coupler multiplexes inputted signal light and one pumping light split at the splitting coupler, and an EDF amplifies the signal light, and a narrow-band coupler multiplexes the amplified signal light and the other pumping light split at the splitting coupler in its transmission band. By changing the ratio of the pumping light power between the forward side and the backward side to the EDF, the deterioration of the noise figure at the optical fiber amplifier can be avoided, even when the output power is changed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical fiber amplifier, comprising:
a pumping light LD (laser diode) for outputting pumping light;
an EDF (erbium-doped fiber) having a first and a second input;
a splitting coupler for receiving said pumping light and splitting said pumping light at a designated ratio to produce a first and a second output;
a short wavelength transmitting coupler for receiving said first output and for directing inputted signal light and said first output to said first input of said EDF;
a narrow-band coupler for receiving and filtering said second output and for directing said filtered second output to said second input of said EDF;

said EDF receiving said inputted signal light, said first output, and said filtered second output;

said EDF amplifying said inputted signal light using said first output and said filtered second output to produce amplified signal light; and said narrow-band coupler directing said amplified signal light away from said EDF;

wherein:

said short wavelength transmitting coupler has a passband;

said narrow-band coupler has a passband; and said passband of said narrow-band coupler spans only a portion of said passband of said short wavelength transmitting coupler.

2. The optical fiber amplifier in accordance with claim 1, wherein:

said pumping light LD outputs pumping light having a center wavelength of either 1480 nm or 980 nm.

3. The optical fiber amplifier in accordance with claim 1, wherein:

a center wavelength of said pumping light is changed by controlling a value of a driving current supplied to said pumping light LD.

4. The optical fiber amplifier in accordance with claim 2, wherein:

the center wavelength of said pumping light is changed by controlling a value of a driving current supplied to said pumping light LD.

5. The optical fiber amplifier in accordance with claim 1, wherein:

a center wavelength of said pumping light is changed by controlling a temperature of said pumping light LD.

6. The optical fiber amplifier in accordance with claim 2, wherein:

the center wavelength of said pumping light is changed by controlling temperature of said pumping light LD.

7. An optical fiber amplifier in accordance with claim 1, wherein:

said EDF comprises an optical fiber using doped erbium as an amplifying material.

8. The optical fiber amplifier in accordance with claim 1, wherein:

a power ratio of said first output to said filtered second output is changed upon reducing a power of said inputted signal light, in order to avoid deterioration of a noise figure of the optical fiber amplifier.

9. The optical fiber amplifier in accordance with claim 8, wherein:

said power ratio is changed by changing a center wavelength of said pumping light.

10. A method for amplifying inputted signal light, the method comprising:

producing a pumping light;

splitting said pumping light at a designated ratio to produce a first and a second output;

directing said inputted signal light and a first wavelength band of said first output to a first input of an EDF (erbium-doped fiber);

filtering said second output to produce a second wavelength band and directing said second wavelength band to a second input of said EDF;

receiving, at said first input of said EDF, said inputted signal light and said first wavelength band;

receiving, at said second input of said EDF, said second wavelength band;

amplifying said inputted signal light at said EDF using said first and said second wavelength bands; and directing said amplified signal light away from said EDF;

wherein said second wavelength band includes only a portion of said first wavelength band.

11. The method in accordance with claim 10, further comprising:

changing a power ratio of said first output to said filtered second output upon reducing a power of said inputted signal light, in order to avoid deterioration of a noise figure at the EDF.

12. The method in accordance with claim 11, wherein said power ratio is changed by changing a center wavelength of said pumping light.

* * * * *